United States Patent
Adam et al.

(10) Patent No.: US 6,285,150 B1
(45) Date of Patent: *Sep. 4, 2001

(54) METHOD FOR CONTROLLING THE OPERATING VOLTAGE OF A FAN IN ELECTRICAL EQUIPMENT

(75) Inventors: Jürgen Adam, Burgau; Peter Busch, Augsburg, both of (DE)

(73) Assignee: Siemens Nixdorf Informationssysteme Aktiengesellschaft, Paderborn (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/714,148
(22) PCT Filed: Mar. 14, 1995
(86) PCT No.: PCT/DE95/00354
 § 371 Date: Sep. 18, 1996
 § 102(e) Date: Sep. 18, 1996
(87) PCT Pub. No.: WO95/25894
 PCT Pub. Date: Sep. 28, 1995

(30) Foreign Application Priority Data

Mar. 21, 1994 (DE) ................................. 44 09 614

(51) Int. Cl.$^7$ ..................................... G05B 5/00
(52) U.S. Cl. .................. 318/471; 318/472; 318/473; 388/934; 361/25
(58) Field of Search ................ 361/23–34, 103–106, 361/88, 78, 93.8; 388/934; 318/471–473, 432–434

(56) References Cited

U.S. PATENT DOCUMENTS

| | | | |
|---|---|---|---|
| 5,099,181 | * 3/1992 | Canon | 318/254 |
| 5,197,858 | 3/1993 | Cheng | 318/473 |
| 5,363,024 | * 11/1994 | Hiratsuka et al. | 318/254 |

OTHER PUBLICATIONS

Elektor 7–8/92, L. Svenkerud and A. Kristiansen, "PC–Luefterregler", Aug. 1992, p. 22.
EDN, vol. 35, No. 26, Apr. 1990, James K. Koch, Fan controller minimized audible noise, p. 225–226.
European patent office, Week 9232, Derwent Publications Ltd., London, GB; AN 92–266106, SE467475 (Eriksson) Jul. 20, 1992, pp. 1 and 2.
Patent Abstracts of Japan, vol. 14, No. 264, Jun. 1990; JP 02 073 414, Mitsubishi Electric Corp., K. Yasutake, Data Processor, Mar. 13, 1990, 1 sheet.

* cited by examiner

*Primary Examiner*—David S. Martin
(74) *Attorney, Agent, or Firm*—Schiff Hardin & Waite

(57) ABSTRACT

In order to control the operating voltage of a fan in electrical equipment, the temperature of an output diode (D) of an output circuit of the power supply of the electrical equipment is monitored. The operating voltage of the fan is controlled as a function of the component temperature of this physical element such that up to a limit temperature, which is in the region of the maximum permissible component temperature of a physical element which absolutely becomes the hottest, the operating voltage of the fan is regulated at a constant, minimum level. The operating voltage is then regulated to rise continuously and rapidly up to a maximum operating voltage at which, although the component temperature of the physical element which absolutely becomes the hottest is still above the limit temperature, it is below the maximum permissible component temperature of this physical element, however.

4 Claims, 2 Drawing Sheets

METHOD FOR CONTROLLING THE OPERATING VOLTAGE OF A FAN IN ELECTRICAL EQUIPMENT

BACKGROUND OF THE INVENTION

The invention relates to a method for controlling the operating voltage of a fan in electrical equipment.

For a power supply with fan cooling, a fan is frequently used whose rotation speed is controlled for noise reduction. Particularly in a quiet office environment, the fan noise using conventional temperature/rotation-speed control is nevertheless considered to be too loud in this case. When reducing the fan rotation speed, care must be taken to ensure that the electronic physical elements which are to be protected remain below the maximum permissible component temperature throughout the entire load and temperature range.

According to a previously known method, the air temperature of the power supply is converted into a control voltage for the fan with the aid of a power stage and a temperature-dependent physical element, for example using a so-called NTC or PTC thermistor, that is to say a resistor whose resistance becomes correspondingly greater when it is cooled down or heated up, respectively. The temperature/voltage characteristic which is used in this case is at the same time relatively flat or broad, that is to say the control voltage rises in a wide range, for example between 20° Celsius and 60° Celsius, from a basic voltage level to the maximum fan voltage.

In the case of some fan controllers, the temperature sensor is mounted on a heat sink of power components in the power supply so that the output power of the power supply is also taken into account when setting the fan operating voltage.

U.S. Pat. No. 5,197,858 discloses a temperature-controlled speed adjustment of fans in electrical equipment, which adjustment carries out the control of the fan in such a manner that the fan rotation speed is set to be constant at a first value up to a first equipment temperature limit. After this, the fan rotation speed is continuously increased up to a second equipment temperature limit. Above the second equipment temperature limit, the fan rotation speed remains constant.

In this context, a circuit arrangement is admittedly specified in which the respective equipment temperature limits can be adjusted between which the continuous rise in the fan rotation speed is intended to take place. However, only the principle is in fact specified as to how regulation of the fan rotation speed is intended to be carried out. The regulation of the fan rotation speed is admittedly related to a reduction in the fan noise. However, no proposal is made as to how the fan noise can be reduced to the maximum extent while maintaining the cooling function for an associated electrical equipment.

"PC-Lüfterregler" (PC fan regulators) by Svenkerud/Kristiansen in DE-Z "Elektor" (Elector), Issue 7-8/92, page 22 discloses a circuit arrangement for controlling the fan RPM of a fan in an electrical apparatus, which, besides a start-up controlling, carries out a fan RPM controlling, such that after the fan is started up, the fan RPM is controlled continuously with an increasing temperature in the electrical apparatus. For this purpose, an inception point and an increase function for the controlling are defined. The inception point is at 2° C. and the increasing is determined such that the fan RPM increases continually as the temperature increases up to a temperature of 30° C. The basis for the controlling is the air temperature in the electrical apparatus, which the control range of 2° C. through 30° C. matches.

With the proposed air controlling, a noise reduction is achieved, however, the noise reduction does not correspond to the noise reduction that could be maximally achieved

SUMMARY OF THE INVENTION

An object of the invention is to specify a method for controlling the operating voltage of a fan in electrical equipment, by means of which method a maximum noise reduction in the fan is achieved in a cheap manner while maintaining required cooling performance.

In general terms the present invention is a method for controlling the operating voltage of a fan in an electrical equipment for cooling electrical physical elements used in the electrical equipment. The physical elements can assume a component temperature to above a maximum permissible operating temperature as a function of an instantaneous power and an ambient temperature. The temperature of an output diode of an output circuit of the power supply of the electrical equipment is monitored. The operating voltage of the fan is controlled as a function of the component temperature of this output diode such that up to a limit temperature which is in the region of the maximum permissible component temperature of a physical element which absolutely becomes the hottest in the electrical equipment. The operating voltage of the fan is regulated at a constant, minimum level. The operating voltage is then regulated to rise continuously and rapidly as a function of the temperature up to an operating voltage at which the increase in the fan rotation speed associated therewith still ensures that, although the component temperature of the physical element which absolutely becomes the hottest is still above the limit temperature, it is below the maximum permissible component temperature of this physical element.

In an advantageous development of the present invention a higher starting voltage is used for starting the fan than the minimum operating voltage of the fan after starting.

According to this, the fan is always operated at an operating voltage which is as low as possible. This is achieved by the following points.

A physical element in the power supply is used as the reference physical element for the determination of a temperature at which regulation is intended to take place, since this results in physical elements whose temperature responses correspond in a very highly proportional manner to the equipment power and thus make it possible to deduce how hot other physical elements in the equipment will become, in detail. On this basis, it is not necessary to monitor other temperature-critical physical elements in addition, even if this could still be done, in addition, directly. It is necessary only to determine the relationship between the reference physical element and a respective other physical element and then to set the regulation of the temperature of the reference physical element in such a manner that the maximum operating temperature of a respectively desired other physical element is also taken into account.

The output diode of an output circuit of the power supply with the greatest power to be emitted is used, in particular, since this component is one of the physical elements which becomes the hottest and, in addition, this component is as a rule already mounted on a heat sink so that its temperature response is correspondingly slow and a temperature sensor can very easily be provided.

As a result of the control of the fan according to the invention, the rotation speed of the fan is not accelerated until extremely late and then in all cases only to the extent that sufficient cooling is just still provided.

Electrical equipment, such as a personal computer, is composed of a main component or processor and a power supply. A fan is located in the power supply. The fan produces an air-flow in the electrical equipment. In a typical embodiment air at a first temperature enters the main component by a slot in the side of a case of the electrical equipment. The air that emerges from the main component at a second temperature then enters the power supply. The air which enters the power supply at the second temperature is measured in the power supply either by a temperature dependent thyristor having a positive temperature coefficient or by a temperature dependent thyristor having a negative temperature coefficient. The operating voltage of the fan is regulated as a function of the measured air temperature. The air in the power supply is then blown out of the power supply by the fan. This draws further fresh air into the main component. This is the typical operation in the prior art.

The operating voltage of the fan is controlled in accordance with broad characteristics. The operating voltage is a function of the air temperature in the prior art devices, and the fan rotates at a basic rotational speed for a first air temperature. As the air temperature increases up to a second air temperature the rotation of the fan is increased up to a maximum operating voltage for the predetermined maximum second air temperature. The fan rotates at its maximum rotational speed at the maximum operating voltage of the fan.

According to the present invention however, the temperature for effecting the operating voltage of the fan is no longer determined using the air temperature within the power supply, but is determined using a heat sink temperature of a heat sink, for example, for an output diode. The temperature dependent thyristors are arranged on the heat sink of the diode for measuring the temperature of the output diode.

The operating voltage of the fan for the present invention is determined according to a predetermined characteristic. According to the predetermined characteristic, the operating voltage of the fan remains constant at a basic fan voltage up to a first heat sink temperature. The first heat sink temperature represents a limit temperature. Above the limit temperature, the operating voltage of the fan rises continuously and rapidly. At a higher, second heat sink temperature, the fan voltage is at a maximum for a maximum operation of a fan. The second heat sink temperature is selected such that all physical elements in the electrical equipment are still below a maximum permissible operating temperature.

In a simple case, the control for the fan is converted into temperature regulation, which is produced by the fan, of the main heat sink in the power supply. In this case, ventilation of the electrical equipment is based on limiting a component temperature of a hottest (electrical or electronic) physical element to a predetermined maximum value which is below a temperature value which would damage the other physical elements. For example, a temperature of 100° C. is normal. The physical elements may be both in a load and in a power supply. In the example of a first computer, this may be a microprocessor, as well as, a 5 volt output diode in the power supply. In some embodiments and operation, the output diode will be hotter than the microprocessor, and in other situations the microprocessor will be hotter than the output diode. When cost and complexity are not an issue, each critical physical element could be monitored individually with a temperature sensor. In this case, the temperature of the hottest physical element determines the voltage for the fan. The lowest rotational speed for the fan results from the lowest permissible operating voltage of the fan at which the fan still operates reliably. In order to achieve the minimum possible rotational speed over the entire load range of the fan, this lowest fan rotational speed is still maintained as the component temperature rises. The fan voltage does not start to rise until a first limit temperature is exceeded. The rise in the temperature/voltage characteristic is relatively steep. The maximum fan voltage is reached at an upper second heat sink temperature which, for tolerance reasons, is somewhat below the maximum component temperature. This form of temperature/voltage characteristic is the minimum possible rotational speed of the fan at a low load, while the minimum necessary rotation of the fan is set at a higher load in order to operate the hottest physical element within a safety margin which is below a maximum temperature of the hottest physical element. The temperature response of the hottest physical element is taken into consideration, and this corresponds to the temperature regulation of this physical element via the fan rotational speed.

In a first advantageous development of the present invention, and in order to reduce cost and complexity, the number of temperature sensors can be reduced to a single sensor which is thermally connected to the heat sink of the 5 volt output diode in the power supply. In most cases, this is the hottest physical element in the power supply. It is now determined by measurements in the entire system at various upgrade levels, load levels, and outside temperatures, whether there is any physical element in the load which exceeds its working temperature range with this regulation. If this is the case, the first and second temperature limits must be appropriately reduced until all the physical elements remain below their maximum temperatures in all operating conditions. In order to reduce the lowest operating voltage for the fan still further, the operating voltage of the fan can be briefly increased during starting, in order that it starts reliably. The lowest permissible operating voltage which is set after this can be lower, since the starting of the fan normally requires more voltage than the operation after starting at a constant rotational speed.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
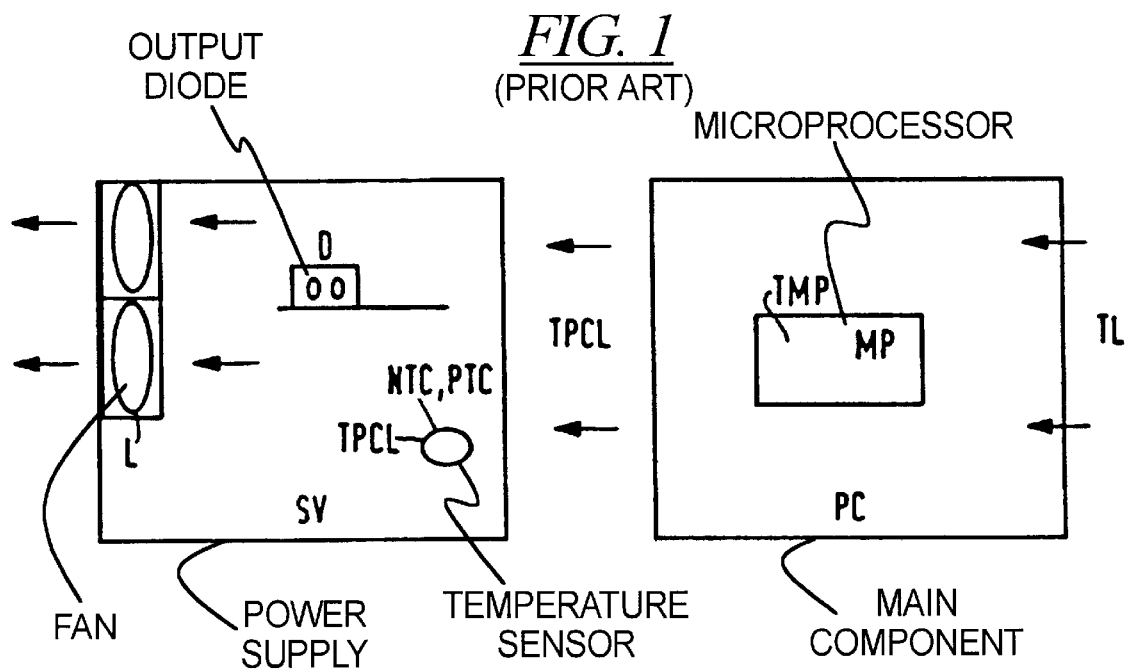
FIG. 1 shows an outline illustration of an electrical equipment having fan control in accordance with a known type.

FIG. 1 shows an electrical equipment which is composed of a main component PC and a power supply SV. Such equipment may be, for example, a personal computer.

A fan L is arranged in the power supply SV. The fan L produces an air flow in the electrical equipment, which air flow is indicated by arrows. In this case, air at the temperature TL enters the main component PC via slots at the side. The air then emerges from the main component PC at the temperature TPCL and enters the power supply SV. The air which enters the power supply SV at the temperature TPCL is then measured in the power supply SV either by a temperature-dependent thermistor having a positive temperature coefficient PTC or by a temperature-dependent thermistor having a negative temperature coefficient. The operating voltage of the fan is regulated as a function of the measured air temperature. The air in the power supply is then blown out of the power supply by the fan. The suction draws fresh air into the main component PC.

Figure 2:
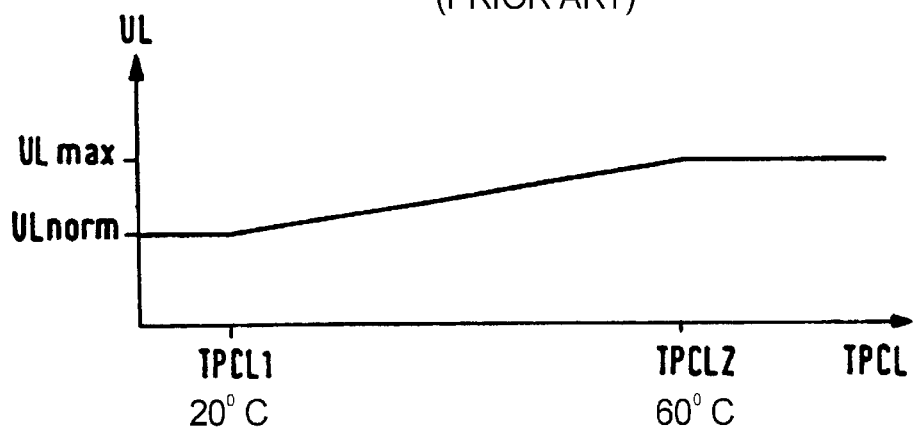
FIG. 2 shows a temperature regulation response of the electrical equipment according to FIG. 1.

The operating voltage of the fan L is controlled in accordance with a broad characteristic, as is shown in FIG. 2. In the case of an air temperature TPCL1, a voltage ULnorm is produced for the fan L, at which voltage the fan L rotates at a basic rotation speed. Up to an air temperature of TPCL2, which corresponds to a maximum permissible temperature at which it is assumed that all the physical elements in the electrical equipment are still operating correctly, the fan voltage UL is increased up to a level ULmax. The fan rotates at its maximum rotation speed at the maximum fan voltage ULmax.

The situation which is illustrated in FIGS. 1 and 2 represents a prior art. The situation which is shown in FIGS. 3 and 4 represents a solution according to the invention.

Figure 3:
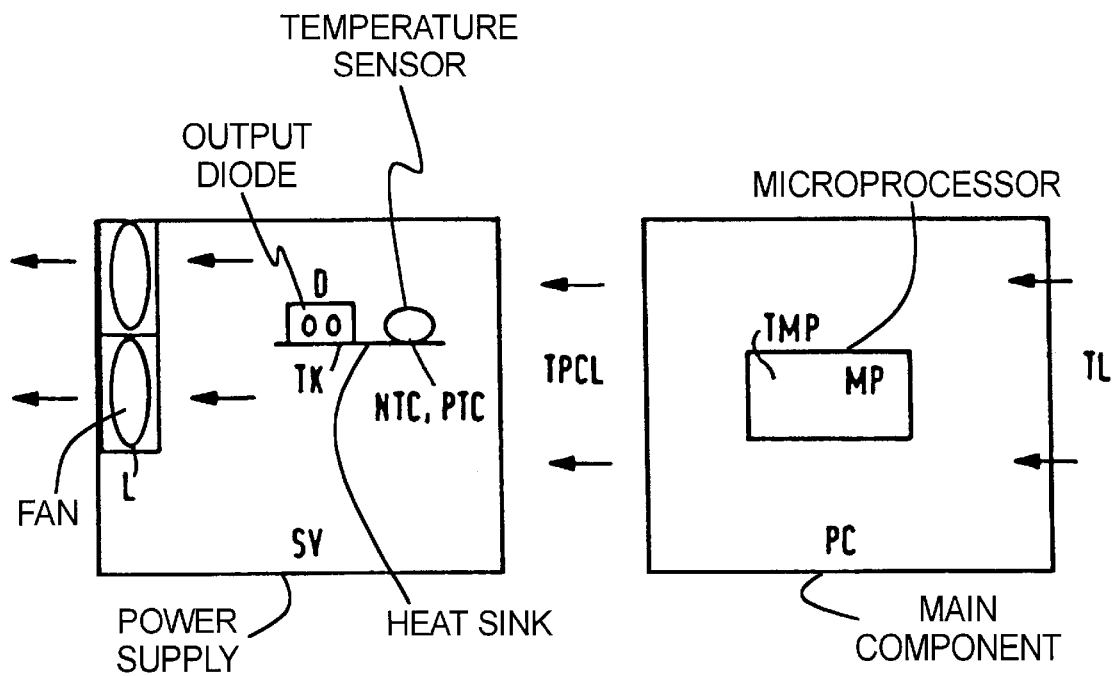
FIG. 3 shows an outline illustration of an electrical equipment having fan control according to the invention.

FIG. 3 shows the same electrical equipment as that in FIG. 1, but with the difference that the temperature for producing a fan voltage UL is no longer determined using the air temperature within the power supply SV but using the heat sink temperature TK of the heat sink for an output diode D. The temperature-dependent thermistors PTC and NTC, respectively, are arranged on the heat sink of the diode D for this purpose.

Figure 4:
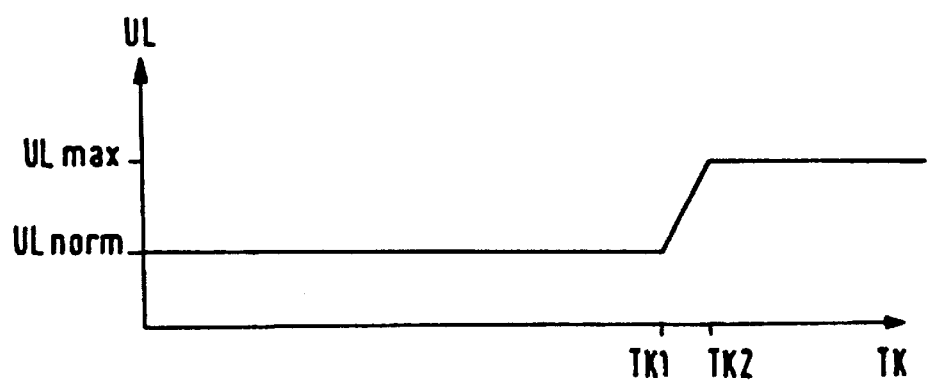
FIG. 4 shows a temperature regulation response of the electrical equipment according to FIG. 3.

The determination of the fan voltage UL is in this case carried out in accordance with the characteristic indicated in FIG. 4. According to the characteristic, the fan voltage remains constant at a basic fan voltage ULnorm up to a first heat sink temperature TK1. The first heat sink temperature TK1 represents a limit temperature. Above the limit temperature TK1, the fan voltage UL rises continuously and rapidly. At a higher, second heat sink temperature TK2, the fan voltage UL is at a maximum, at a value ULmax. The second heat sink temperature TK2 is selected in such a manner that all the physical elements in the electrical equipment are still below the maximum permissible operating temperature. The limit temperature TK1 is established in the region of the second heat sink temperature TK2.

There now follows a general description of the situation illustrated in FIGS. 3 and 4.

It is to be understood that the electrical apparatus depicted in FIG. 3 is the same electrical apparatus as is depicted in FIG. 1. It is thus clear that, first, the object identified as element D in FIG. 1 is an output diode, and second, that the output diode D is the same output diode used in FIG. 3.

In the simplest case, the control for the fan L is converted into temperature regulation, which is produced by the fan, of the main heat sink in the power supply SV. In this case, one starts from the following consideration: the ventilation of an electrical equipment is based on limiting the component temperature of the hottest (electrical or electronic) physical element to a predetermined maximum value which is below the respective destruction limit. A temperature of 100° Celsius is normal, for example. The physical elements in question may be both in the load and in the power supply. In the example of a personal computer, this may be a microprocessor MP and, at the same time, a 5-volt output diode D in the power supply. Depending on the upgrade level and the load level, the output diode D will be hotter, on the one hand, in this case, and the micro-processor MP will be hotter in another load case. If cost and complexity play only a minor role, each critical physical element can be monitored individually with a temperature sensor. In this case, the temperature of the hottest physical element determines the voltage for the fan L. The lowest rotation speed for the fan L results from the lowest permissible operating voltage ULnorm of the fan L at which the fan still starts reliably. In order now to achieve the minimum possible rotation speed over the entire load range for the fan L, this lowest fan rotation speed is still maintained as the component temperature rises. The fan voltage UL does not start to rise until a limit temperature TK1 is exceeded. The rise in the temperature/voltage characteristic is relatively steep (considerably steeper than, for example, the characteristic illustrated in FIG. 2). The maximum fan voltage ULmax is reached at an upper heat sink temperature TK2 which, for tolerance reasons, is somewhat below the maximum component temperature. This form of temperature/voltage characteristic gives the minimum possible rotation speed of the fan L at low load, while the minimum necessary rotation speed of the fan is set at higher load in order to operate the hottest physical element with a safety margin below its maximum temperature. If the temperature response of the hottest physical element is considered, this corresponds to a temperature regulation of this physical element via the fan rotation speed.

Two advantageous refinements are conceivable: in order to reduce costs and complexity, the number of temperature sensors can be reduced to a single sensor which is thermally connected to the heat sink of the 5-volt output diode D in the power supply SV. In most cases, this is the hottest physical element in the power supply SV. It is now necessary to determine by measurements in the entire system at various upgrade levels, load levels and outside temperatures whether there is any physical element in the load which exceeds its working temperature range with this regulation. If this is the case, the two temperature limits TK1 and TK2 must be appropriately reduced until all the physical elements remain below their maximum temperatures in all operating conditions. In order to reduce the lowest operating voltage ULnorm for the fan still further, the operating voltage of the fan L can be briefly increased during starting, in order that it starts reliably. The lowest permissible operating voltage which is set after this can be lower, since the starting of the fan L normally requires more voltage than the operation after starting at a constant rotation speed.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for controlling an operating voltage of a fan in an electrical equipment for cooling electrical physical elements used in the electrical equipment, comprising the steps of:

monitoring a temperature of an output diode, the temperature of the output diode being indicative of the greatest power of an output circuit of a power supply of the electrical equipment, said output diode having a temperature response corresponding to power being fed by the power supply to the electrical equipment so that its temperature is thus related to how hot other physical elements in the equipment will become;

controlling an operating voltage of the fan as a function of the temperature of the output diode; and the operating voltage of the fan being controlled such that the operating voltage of the fan is first regulated at a constant minimum level until a first temperature is reached by the output diode at which time the operating voltage of the fan is regulated to rise continuously as a function of the output diode temperature until a second higher output diode temperature is reached at which the fan voltage is at a maximum, the second temperature being selected such that all physical elements in the electrical equipment including the output diode are still below a maximum permissible operating temperature.

2. The method according to claim 1 wherein the output diode temperature comprises a temperature of a heat sink to which the output diode is connected.

3. The method according to claim 1 wherein the fan rotates at its maximum rotation speed at said maximum fan voltage.

4. The method according to claim 1 wherein a starting voltage is used for starting the fan which is higher than said minimum operating voltage of the fan after starting.

* * * * *